(12) United States Patent
Kogiantis et al.

(10) Patent No.: US 7,433,661 B2
(45) Date of Patent: Oct. 7, 2008

(54) METHOD FOR IMPROVED PERFORMANCE AND REDUCED BANDWIDTH CHANNEL STATE INFORMATION FEEDBACK IN COMMUNICATION SYSTEMS

(75) Inventors: Achilles G. Kogiantis, Madison, NJ (US); Aris L. Moustakas, New York, NY (US); Lawrence H. Ozarow, Morris Township, NJ (US); Steven H. Simon, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 685 days.

(21) Appl. No.: 10/603,290

(22) Filed: Jun. 25, 2003

(65) Prior Publication Data

US 2004/0266484 A1 Dec. 30, 2004

(51) Int. Cl.
*H04B 17/00* (2006.01)

(52) U.S. Cl. ............... 455/226.2; 455/226.1; 455/226.3; 370/329; 370/327

(58) Field of Classification Search ............. 455/226.2, 455/226.1, 226.3; 370/329, 327
See application file for complete search history.

(56) References Cited

U.S. PATENT DOCUMENTS

| | | | |
|---|---|---|---|
| 6,240,094 B1 * | 5/2001 | Schneider | 370/412 |
| 6,539,008 B1 * | 3/2003 | Ahn et al. | 370/342 |
| 6,999,724 B2 * | 2/2006 | Chizhik et al. | 455/63.1 |
| 7,050,776 B2 * | 5/2006 | Kim et al. | 455/277.1 |
| 7,079,514 B2 * | 7/2006 | Kim et al. | 370/335 |
| 2003/0043764 A1 * | 3/2003 | Kim et al. | 370/329 |
| 2003/0123396 A1 * | 7/2003 | Seo et al. | 370/252 |
| 2003/0134605 A1 * | 7/2003 | Kim et al. | 455/101 |
| 2004/0042427 A1 * | 3/2004 | Hottinen | 370/335 |
| 2004/0087325 A1 * | 5/2004 | Cheng et al. | 455/515 |
| 2006/0039312 A1 * | 2/2006 | Walton et al. | 370/319 |

* cited by examiner

*Primary Examiner*—Matthew Anderson
*Assistant Examiner*—Minh Dao

(57) ABSTRACT

A method of transmitting information over a feed back channel of a communication system that has multiple antenna systems is provided. Long term channel condition information is obtained from received measured and/or calculated channel parameter values. The obtained long term channel condition information is arranged in a particular manner and transmitted over a defined time period during which the long term channel condition information varies relatively slowly. Because the long term information remains relatively constant for one or more defined time periods, the amount of bandwidth needed to communicate this value is small because it need only be communicated occasionally. Thus only a small bandwidth needs to be allocated for transmitting this long term information.

4 Claims, 1 Drawing Sheet

METHOD FOR IMPROVED PERFORMANCE AND REDUCED BANDWIDTH CHANNEL STATE INFORMATION FEEDBACK IN COMMUNICATION SYSTEMS

BACKGROUND OF THE INVENTION

1. Field of the Invention

The present invention relates to wireless communication systems.

2. Description of the Related Art

Communication systems, and in particular, wireless communication systems convey (i.e., transmit and/or receive) information over communication channels. In many cases, the quality of such channels varies depending on various well-known channel parameters. Certain channel parameters such as channel fading, phase jitter, frequency translation, signal to noise ratio (SNR) or carrier to interference ratio (C/I) often have a direct effect on the quality of a particular channel. The channel parameters can be measurements of specific physical quantities that occur in the channel, e.g., phase jitter, channel fading and frequency translation are representative of such physical quantities. Other channel parameters are the results of calculations of one or more physical quantities; examples of these other parameters are SNR and/or C/I. Information transmitted through the communication channels are often adversely affected by the channel parameters. In short, there is typically a direct relationship between the quality of a particular communication channel and the values of one or more of these channel parameters.

In many communication channels, particularly wireless communication channels, the quality of a particular communication channel may vary from instant to instant during transmission. The quality of a communication channel relates to the ability to transmit relatively high data rates with no or relatively few errors detected at a receive end of the channel. Thus, for a given period of time the amount of information or the rate at which information is conveyed over a particular channel may be one value and at the next period of time, the rate or amount of information can change to another value.

To address the problem of varying channel conditions, communication systems can transmit the information signals at relatively high power so that when the channel conditions are adverse, the relatively large transmit power would still allow transmitted signals to be properly detected and thus prevent errors from occurring. The use of relatively large transmit power may help reduce the error rate, but at the expensive cost of power. Therefore, many communication systems use a feedback mechanism whereby a receiver, after having received information over a communication channel, transmits channel condition information to the corresponding transmitter over a feedback channel where such channel condition information contains channel parameter values for the communication channel over which the transmitted information was received.

In a wireless communication system, the one or more communication channels through which information is transmitted from a base station to a user or mobile station is commonly referred to as the forward link. The information can be either user information or signaling information or both. User information is information exchanged between two or more users of the communication system or between a user of the communication system and another user of the communication system. The signaling information is used by the communication system to initiate, maintain and terminate communications between users or between users and equipment of the communication system. The user equipment or mobile station is able to measure and/or calculate channel parameters of the forward link from the information received from the transmitting base station. The channel parameters are referred to as channel state information (CSI).

The CSI, which represents the condition of a communication link (e.g., the forward link) at a particular instant in time, is generated by the mobile station and then transmitted over a feedback channel to the base station; that is, the mobile measures and/or calculates various channel parameters and transfers channel parameter values to a channel state matrix whose contents are transmitted over the feedback channel. The channel state matrix thus contains one or more channel parameter values, i.e., channel condition information. The base station will adjust either its transmission power, information rate or amount of information transmitted based on the channel condition information it receives from the mobile over the feedback channel. For example, the base station may reduce the transmission power because the conditions of the forward link have improved. The channel condition information is transmitted over the feedback channel in periodic fashion; that is every T seconds, channel condition information is transmitted over the feedback channel for a particular mobile station. T is a defined time period. The channel condition information can also be transmitted a periodically. Depending on the rate of transmission of the channel condition information, the amount of feedback information transmitted for each user may use a relatively large amount of communication resources such as power and bandwidth. The term bandwidth as used in this context refers to the amount of information (e.g., number of bits) that can be transmitted during a defined time period. As the throughput of wireless communication systems increases, the amount of information that is transmitted over the feedback channels increases accordingly. The throughput of a communication channel or system is the amount of information that is successfully conveyed over the channel or system during a defined time period. Successful conveyance of information refers to receiving information with no errors with a system defined acceptable amount of errors. Therefore, as communication systems increase their throughput, more resources are allocated to the feedback channels.

Certain communication systems use multiple antenna systems such as Multiple Input Multiple Output (MIMO) antenna systems in which transmitting and receiving equipment use multiple antennas to simultaneously transmit and/or receive information over communication channels. Other examples of multiple antenna systems are Multiple Input Single Output (MISO) systems and Single Input Multiple Output (SIMO) systems. MISO systems have multiple transmit antennas at one end and a single receive antenna. SIMO systems have a single transmit antenna at one end and multiple receive antennas. It should be noted that in all the aforementioned multiple antenna systems, the multiple antenna structures have multiple antennas that are capable of transmitting and/or receiving information.

Wireless communication systems with multiple antenna systems and a feedback channel arrangement have to use even more resources for the feedback channels; this is because channel condition information as seen by each one of the multiple antennas is transmitted over the feedback channel. Thus, more bandwidth is needed and correspondingly more available transmission power is needed to implement such a feedback arrangement. What is, therefore needed, is a technique that uses the bandwidth of the feedback channel more efficiently and/or a technique that uses relatively less bandwidth or a reduced bandwidth for the feedback channel of a communication system that has multiple antenna systems.

SUMMARY OF THE INVENTION

The present invention provides a method of transmitting long term information over a feed back channel of a communication system that has multiple antenna systems. The long term information is obtained from information representing measured and/or calculated channel parameters. The long term information is information received over one or more communication channels and such information has been determined to vary relatively slowly over a defined time period. The long term information is obtained from the received information or from at least a portion of the received information that varies relatively slowly over the defined time period. The obtained long term information can be one or more parameters or a portion of one or more parameters.

In particular, the method of the present invention receives information transmitted by one or more multiple antenna systems over one or more channels of the communication systems. The received information can be system information and/or user information. The method of the present invention then derives channel parameters from the received information by measuring and/or calculating such parameters from the received information. Alternatively, the received information can be already measured and/or calculated channel parameters. The long term information is obtained from one or more channel parameters or portions of one or more channel parameters. The obtained long term information is arranged in a particular manner or format and is transmitted over a feed back channel during a defined time period. Because the long term information varies relatively slowly over the defined time period, such information need not be transmitted repetitively during such period thus reducing the throughput of the channel over which such long term information is transmitted. Further, because the value of the long term information remains relatively constant for one or more defined time periods, the amount of bandwidth used to communicate this value is relatively small because it need only be communicated occasionally. Thus only a small bandwidth needs to be allocated for transmitting this long term information.

DETAILED DESCRIPTION

Figure 1:
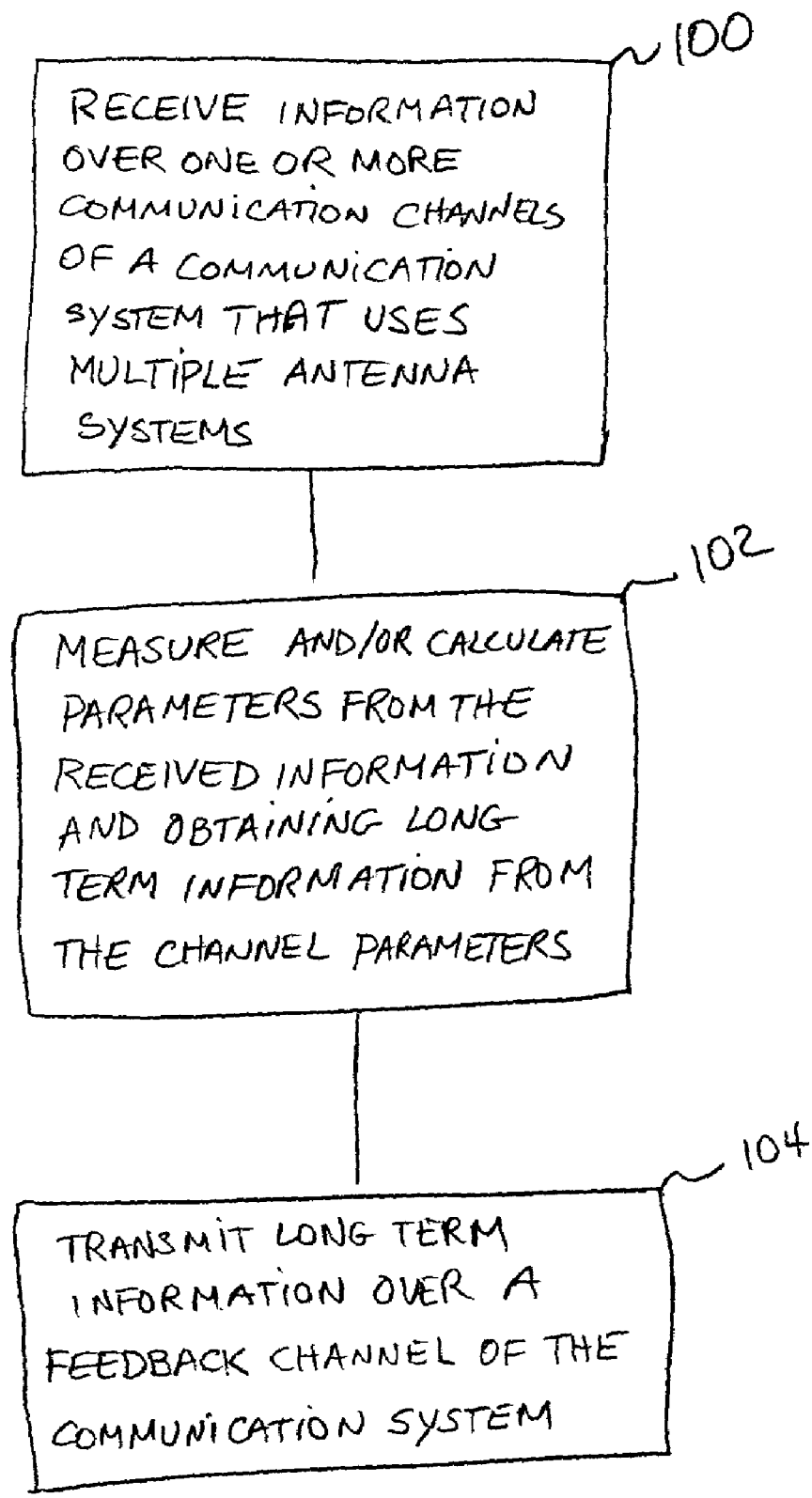
FIG. 1 is a flow chart of the method of the present invention.

The present invention provides a method of transmitting long term information over a feed back channel of a communication system that has multiple antenna systems. The long term information is obtained from information representing measured and/or calculated channel parameters. The long term information is information received over one or more communication channels and such information has been determined to vary relatively slowly over a defined time period. The long term information is obtained from the received information or from at least a portion of the received information that varies relatively slowly over the defined time period. The obtained long term information can be one or more parameters or a portion of one or more parameters.

In particular, the method of the present invention receives information transmitted by one or more multiple antenna systems over one or more channels of the communication systems. The received information can be system information and/or user information. The method of the present invention then derives channel parameters from the received information by measuring and/or calculating such parameters from the received information. Alternatively, the received information can be already measured and/or calculated channel parameters. The long term information is obtained from one or more channel parameters or portions of one or more channel parameters. The obtained long term information is arranged in a particular manner or format and is transmitted over a feed back channel during a defined time period. Because the long term information varies relatively slowly over the defined time period, such information need not be transmitted repetitively during such period thus reducing the throughput of the channel over which such long term information is transmitted. Further, because the value of the long term information remains relatively constant for one or more defined time periods, the amount of bandwidth used to communicate this value is relatively small because it need only be communicated occasionally. Thus only a small bandwidth needs to be allocated for transmitting this long term information.

For ease of explanation, the method of the present invention will be discussed in the context of a mobile station receiving information (e.g., channel condition information) from a base station where both the mobile and the base station are part of an 3G1x-EVDV (Evolution Data Voice) communication system modified to include multiple antenna systems and where such mobile station transmits long term information to the base station over a feed back channel of the communication system. The long term information thus can represent channel condition information that provides the base station an indication of the quality of the forward link between the mobile station and the base station. The base station processes the channel condition information as per the method of the present invention. The base station has one or more multiple antenna system and the mobile also has one or more multiple antenna systems. The method of the present invention is also applicable to SIMO and MISO communication systems. Both EV-DO and EVDV wireless communication systems use feed back channels to allow a mobile unit to transmit channel condition information to the serving base station.

Referring to FIG. 1 there is shown a flow chart of the method of the present invention. In step 100, information (i.e., user and/or system information) transmitted over a forward link of the communication system by a base station is received by the mobile station. The information is transmitted through the use of a multiple antenna system and received by a mobile that is using multiple antennas. Note that the mobile can also be using a single antenna. The received information can be either user information or signaling information or both. Usually, pilot signals are the signals carrying the received information from which channel parameter values are extracted or obtained. Pilot signals are standard signals used for various purposes in wireless communication systems; pilot signals, for example, are used as beacon signals to assist mobiles to obtain access to a communication system.

In step 102 using the received information obtained from the pilot signals, one or more channel parameters that are either measured or calculated over a defined period of time. Using different methods, both short term and long term information are extracted from the measured signal. The long term information can be one or more channel parameters that are either measured and/or calculated over a defined time period where the value of such parameters varies relatively slowly or not at all. In general, long term information are any information obtained from measured and/or calculated received information which information vary relatively slowly over a defined time period. The received information may already be measured and/or calculated channel parameters; in such a case the method of the present invention obtains long term information by first determining long term portions and short term portion of the channel parameters. The long term portions of channel parameter values that vary relatively slowly over a defined time period. The long term portion can also be entire channel parameter values that vary relatively slowly over a defined time period. This defined time period is selected as a period of time during which the one or more channel parameters will not vary or will vary relatively slowly. Statistical history, for example, of the one or more parameters can be used to determine the defined time period. The long term information can also be other information that relate to the operation of a communication channel of the EVDV communication system.

For a communication system having multiple antenna systems, one example of a channel parameter that is measured is correlation between different antennas at a base station. Correlation between antennas (or antenna correlation) is defined as $$E\{X(t) \cdot X^H(t)\}$$

where the vector $$X(t)^{66} = [x_1(t), x_2(t), \ldots, x_M(t)]$$

is a time varying received complex signal vector on all M antennas (M is an integer equal to 2 or greater), H denotes a mathematical operation called the Hermitian conjugation operation and $E\{\}$ is the expectation (or averaging) operation in the probability space of the random processes X(t). An example of a channel parameter that is calculated is C/I. The calculation of C/I involves the measurement of the power of the desired received signals (i.e., at the mobile) and the power of other signals characterized as noise or interference. The ratio of the measured signal power and noise or interference power is calculated as C/I. The C/I calculation can be done by the mobile or by processing equipment at the base station. Variations in received signal power, commonly referred to as signal fading, occur on the order of tens to hundreds of milliseconds. Variations in the correlation between antennas occur typically on the order of seconds, i.e., 1-5 seconds. Thus, for signal fading a typical value for C/I is usually calculated every 1.25 milliseconds and for correlation between antennas a value is generated typically every 1 or 2 seconds.

The method of the present invention obtains long term information from channel parameter values. The obtained long term information is arranged as per a particular format that is known by both the base station and the mobile. The format is the particular arrangement of the obtained long term information. In step 104 the arranged long term information is transmitted over a feedback channel. Short term information also obtained from channel parameter values and are also arranged in a particular format and then transmitted over the feed back channel.

Because the correlation values (i.e., antenna correlation values) vary at relatively much slower rates (values change every 1 to 2 seconds), the method of the present invention can use the correlation values as long term information without having to determine long term components of such information. The correlation values are simply transmitted as long term information over the feedback channel. The method of the present invention can define a unit time window having a 2 second duration during which one correlation value is transmitted. Alternatively, the method of the present invention can define a time window N time units long where each time unit is 2 seconds long and N is an integer equal to 1 or greater. During the time period having length of N time units one correlation value is transmitted because the correlation value may have been determined as typically varying after N time units have elapsed.

For the C/I parameters, which typically vary at a 10-20 millisecond rate, the method of the present invention first determines relatively slow varying portions of such information and use such slow varying information as long term information. The remaining portion of the C/I parameter value can still be transmitted at the 10-20 millisecond range and such remainder portion is referred to as short term information. Short term information is information or portion of information that is received and transmitted at a relatively fast rate. Usually, short term information is received and transmitted at the same rate. A defined time period or time window for C/I can be 20 milliseconds. The long term information can be transmitted over N time periods where N is an integer equal to 1 or greater. For example, for the C/I channel parameter, values can be measured during a time window of 400 milliseconds (N=20, i.e., 20 frames of an EVDO or EVDV system where each frame is 20 milliseconds long) and over the 400 millisecond time period, portions of the C/I values are relatively slow varying. The value of N is a system value that is known by mobile and base station and can be changed by the system. Prior to the beginning of transmissions of C/I values or any other channel parameters, the value of N is set by the communication system and is known by the mobile and the base station. The base station thus knows the beginning of the C/I information and the length of such information from the mobile.

A C/I value can be analyzed in terms of its decade value or threshold value which represents long term information and its delta value which represents short term information. For example, the following values of C/I can be received over time: (1)10 dB; (2) 12 dB; (3) 17 dB and (4)13 dB. The values can be expressed as (1) $10+\Delta_1$; (2) $10+\Delta_2$; (3) $10+\Delta_3$ and (4) $10+\Delta_4$ where $\Delta_1=0$ dB, $\Delta_2=2$ dB, $\Delta_3=7$ dB and $\Delta_4=3$ dB. Thus, each value has a long term portion and a short term portion. The long term portion is defined as a decade portion and the short term portion is defined as a delta (i.e., $\Delta$) portion. The decade portions are values that are multiples of 10. The decade portions change relatively slowly and can thus be used as long term information. The delta portions change every 1-2 milliseconds and are transmitted at that rate by the method of the present invention. However, because the decade portions remain relatively the same, one or a few decade portion can be transmitted over N time widows thereby saving bandwidth.

Assuming the C/I values can vary in the range of 0 dB to 80 dB. Normally 7 bits would be needed to represent the values in the 0-80 dB range with 0 dB represented as '0000000' and 80 dB represented as '1010000'. Three bits can be used to represent the decade information, i.e., 10 dB, 20 dB, 30 dB, 40 dB, . . . , 80 dB and 4 bits can be used to represent the delta information (0-9 dB). Thus, 000 represents 0 dB, 001 represents 10 dB, 010 represents 20 dB, 011 represents 30 dB, . . . , and 111 represents 80 dB. The 3 most significant bits thus represent C/I decade values within a certain range (e.g., 0-80 dB). The decade information can be sent only once during N time windows and the delta information can be sent as short term information at a relatively much faster rate. In the example above the first transmission would be the most significant three bits '000' concatenated to the least four significant bits '0000' where the '000' represents 10 dB long term information and '0000' represents the delta information $\Delta_1$ or 0 dB. The subsequent transmissions for the second, third and fourth values would be '0010', '0111' and '0011' representing 2 dB, 7 dB and 3 dB respectively (i.e., $\Delta_2$, $\Delta_3$ and $\Delta_4$).

During the second, third and fourth transmissions only the delta portions are transmitted. It is understood that the long term portion remains at 10 dB. Therefore other than the first transmission four bits instead of seven bits are used to transmit the C/I value resulting in a decrease in bandwidth usage of more than 40%. The first transmission establishes the decade value for N time windows or until the decade value changes. The method of the present invention can use an extra bit to signal a change in the decade value and immediately thereafter a 7-bit value is transmitted where the most significant three bits represent the new decade value.

Other channel parameters can be analyzed in terms of long term information and short term information by the method of the present invention. For example, the Signal to Noise Ratio (SNR) of a communication channel is another type of a channel parameter that can be used by the method of the present invention. A base station may want to know the SNR measured at a mobile where the range of SNR values is −32 dB and 31 dB. The base station wants to know this information to within the closest 1 dB, and wants this information updated ever 1 millisecond. It might be expected that this requires the mobile to send back a number from −32 dB to 31 dB. Sending back one of 64 numbers (including zero) would require 6 bits ($2^6=64$). Therefore, the mobile could send back 6 bits per time slot. For a time slot of 1 msec. the mobile transmits 6 bits per millisecond or 6000 bits per second. Long term information for the SNR can be defined as a set of the following threshold values: −25 dB, −15 dB, −5 dB, 5 dB, 15 dB, 25 dB where any one of the 6 values can be expressed using 3 bits. The three bits thus represent long term information; in this case a 3-bit code represents an SNR threshold value.

The long term information is transmitted once a second and may represent, for example, an average of previously received SNR values. The transmission rate is thus 3 bits per 1 second (a very low bit rate). Short term information modifies the value received in the long term information by a number ranging from −15 dB to +16 dB. Transmitting one of these 32 numbers requires only 5 bits. These 5 bits are sent once per slot, i.e., 5 bits per milliseconds or 5000 bits per second. For example, if the long term value sent back is +15 dB (which would be the average over the previous second) and the short term value is −4 dB then the base station knows that at that instant the mobile is receiving +15−4 dB=+11 dB.

The total bandwidth used in feeding back both the long term and the short term information is 3 bits/second (for long term)+5000 bits/second (for short term)

which is much less than the initial 6000 bits/second that would have been needed.

In many wireless communication systems the base station may need to know at what bit rate it can transmit to a particular mobile. This is frequently done by the base station making a "rate-request". This rate request involves the mobile transmitting rate request information back to the base station. However, in MIMO systems, the base station may want to know more than just a simple rate before transmitting. For example, sometimes it is advantageous to perform beam forming and send a single bit stream in a particular direction. In some circumstances it is desirable to transmit one beam of signals using beam forming techniques instead of transmitting information using multiple antennas. Beam forming is the combination of different beams of signals from different antennas resulting in an aggregate beam of signals having a certain beam width and direction. A base station may, in addition to the rate request, also want a "direction request". Sometimes, however, it is advantageous to send multiple independent bit streams as in PARC (per antenna rate control). PARC is a particular manner of transmitting data in a MIMO antenna system; in this case, the base station may want multiple rate requests—one for each transmitting antenna. Thus, a significant amount of feedback information is used in these MIMO systems.

A particular code or bit format (generally called an information format) can be established for a 2 transmitter MIMO system. The mobile will make a short term request (3 bits) once every 2.5 milliseconds (one request/slot where a slot is 2.5 milliseconds in length), and will send a long term code (2 bits) once every second. Each long term code represents a particular type of antenna signal transmitted at one of three defined data rates. The data rates can be categorized, for example, as HIGH, MEDIUM AND LOW data rates.

The five bit codes—two of which are long term information—can be as follows:

Long term code 00

Short term code 000=beamform in north direction at low bit rate

Short term code 001=beamform in south direction at low bit rate

Short term code 010=beamform in east direction at low bit rate

Short term code 010=beamform in west direction at low bit rate

Short term code 100=beamform in north direction at medium bit rate

Short term code 101=beamform in south direction at medium bit rate

Short term code 110=beamform in east direction at medium bit rate

Short term code 111=beamform in west direction at medium bit rate

Long term code 01

Short term code 000=beamform in north direction at medium bit rate

Short term code 001=beamform in south direction at medium bit rate

Short term code 010=beamform in east direction at medium bit rate

Short term code 011=beamform in west direction at medium bit rate

Short term code 100=beamform in north direction at high bit rate

Short term code 101=beamform in south direction at high bit rate

Short term code 110=beamform in east direction at high bit rate

Short term code 111=beamform in west direction at high bit rate

Long term code 10

Short term code 000=beamform in north direction at high bit rate

Short term code 001=beamform in south direction at high bit rate

Short term code 010=beamform in east direction at high bit rate

Short term code 011=beamform in west direction at high bit rate

Short term code 100=send 2 bit streams; low bit rate from both antennas

Short term code 101=send 2 bit streams; low bit rate from antenna 1; medium bit rate from antenna 2
Short term code 110=send 2 bit streams; low bit rate from antenna 2; medium bit rate from antenna 1
Short term code 111=send 2 bit streams; medium bit rate from both antennas Long term code 11
Short term code 000=send 2 bit streams; low bit rate from both antennas
Short term code 001=send 2 bit streams; low bit rate from antenna 1; medium bit rate from antenna 2
Short term code 010=send 2 bit streams; low bit rate from antenna 2; medium bit rate from antenna 1
Short term code 011=send 2 bit streams; medium bit rate from both antennas.
Short term code 000=send 2 bit streams; high bit rate from both antennas
Short term code 001=send 2 bit streams; high bit rate from antenna 1; medium bit rate from antenna 2
Short term code 010=send 2 bit streams; high bit rate from antenna 2; medium bit rate from antenna 1
Short term code 011=send 2 bit streams; high bit rate from antenna 2; low bit rate from antenna 1

Long term code 00 represents beam forming at either low or medium bit rates. Long term code 01 represents beam forming at either medium or high bit rates. Long term code 10 represents beam forming at high bit rates and MIMO transmissions. Long term code 11 represents MIMO transmissions. Generally, the long term codes represent either a beam formed signal having a direction and a particular bit rate or a MIMO signal where signals from each antenna have a particular bit rate. Thus, the long term code is long term information that is used to inform a receiver which of a finite set of codes to use to decode the transmitted short term information. Once every second, a long term code is sent back from the mobile. Depending on the condition of a communication channel, either beam forming or PARC techniques can be used to transmit information. In some circumstances, it is prudent to use PARC techniques while in other circumstances it is advantageous to use beam forming. If beam forming is used over the course of a second, for example, then the mobile might transmit a 00 code. For the next second, the mobile could only request beam forming in one of the 4 directions at one of the two lower rates. The advantage of using this information format is that the mobile transmits only 3 bits per slot. However, once per second, the mobile transmits two additional bits.

The long term information obtained from measured and/or calculated channel parameters can be stored in any organized storage data structure or memory space of a processor. The various long term information is aggregated, arranged and stored in a particular manner. Because much less information is now used to characterize a communication channel, much less bandwidth is needed to transmit such information. Also, if the bandwidth allocated to transmit such information does not change, more different types of channel condition information can be transmitted using the same bandwidth. As a result, more different types of channel state information can be stored in the channel matrix. For example, short term information can be stored along with the long term information. The short term information are instantaneously measured and/or calculated values of channel parameters.

Another channel parameter that can be expressed as either long term information or short term channel condition information is the relative phase of the channel of the antennas or the phase of the correlation between antennas of a MIMO antenna system. The signals received at each antenna are complex numbers in their baseband representation. It is then possible to observe that the complex signal measured at one antenna has a different phase than the complex signal measured at another antenna. Moreover, it is possible that an average fixed phase difference between two antennas may be observed for a long period of time. Such channel condition information in its short term form or long term form can also be arranged and stored in the channel matrix with other short term information or long term information.

The base station receives the long term information and based on such long term information makes any necessary adjustments (or modifies) to its transmission of information over the forward link. For example, the average C/I power value being received by a mobile may be less than a system defined desired value. In such a case, the base station may increase the power level at which it transmits information to that mobile. Thus, the base station transmits information over the forward link, it receives long term and short term channel condition information over a feedback channel or a traffic channel from one or more mobiles and adjusts its transmission based on the received short term and long term condition information. Note that the long term and short term channel condition information need not be transmitted over a feed back channel or signaling channel; it can be transmitted over a traffic channel typically used to convey user information. The method of the present invention, although described in the context of a mobile transmitting long term and short term channel condition information over a feed back channel, can also be used by a base station to transmit such long term and short term information over a signaling channel (or user channel) to one or more mobiles to allow the one or more mobiles to adjust their reverse link (communication channels allowing transmissions from mobiles to base station) transmissions to the base station; in this case, it is the base station and/or associated equipment that obtains the long term channel condition information and arranges such information in particular manner or format to as per the method of the present invention.

The transmitted long term information and short term information is received by a device or system (either base station equipment, a mobile or other receiving equipment). The receiving device and/or system then modifies information to be transmitted based on such received long term and short term information. The received short term information can be related to the received long term information. For example both types of information may be representing the same channel parameter values where the long term portion varies relatively slowly. Another example of a related short term information is when the long term information is used to inform the receiver as to how to interpret the short term information as discussed in the long term code example above.

We claim:
1. A method of transmitting information in a communication system having at least one multiple antenna system, the method comprising:
transmitting over N defined time periods long term information arranged in a particular format and obtained from at least a portion of measured or calculated received information where N is an integer equal to 1 or greater; and
transmitting short term information where the long term information is used to inform a receiver which of a finite set of codes to use to decode the transmitted short term information.

2. A method of receiving information in a communication system having at least one multiple antenna system, the method comprising:

receiving long term information arranged in a particular format and transmitted over N defined time periods where N is an integer equal to 1 or greater;

receiving short term information related to the long term information; and determining which of a finite set of codes to use to decode the short term information based upon the long term information.

3. The method of claim 2 further comprising the step of modifying information to be transmitted based on the received long term and related short term information.

4. The method of claim 2 where a mobile receives the long term information and related short term information.

* * * * *